No. 880,686.
PATENTED MAR. 3, 1908.
W. J. MUMFORD.
CLAM DIGGER.
APPLICATION FILED MAY 10, 1907.
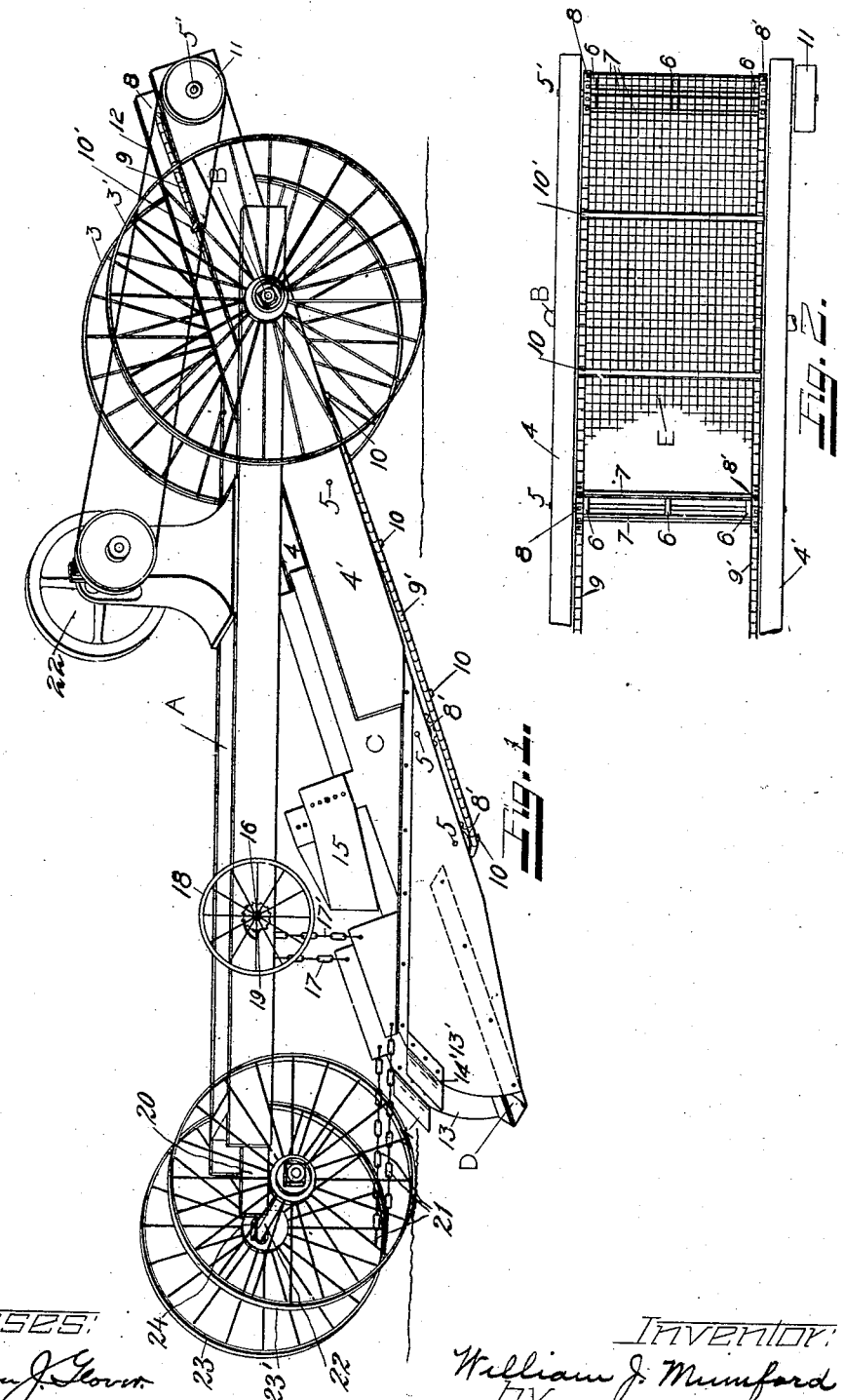

UNITED STATES PATENT OFFICE.

WILLIAM J. MUMFORD, OF SOUTH BEND, WASHINGTON.

CLAM-DIGGER.

No. 880,686.      Specification of Letters Patent.      Patented March 3, 1908.

Application filed May 10, 1907. Serial No. 373,011.

*To all whom it may concern:*

Be it known that I, WILLIAM J. MUMFORD, a citizen of the United States, residing at South Bend, in the county of Pacific and State of Washington, have invented a new and useful Improvement in Clam-Diggers, of which the following is a specification, reference being had to the accompanying drawings.

My invention relates to fishing and trapping and more especially to a land trapping device.

The object of my device is to provide a portable trap or digger which may be operated on land, and having a digger or dredger and conveyer, all moved by suitable power.

I attain these objects and other practical advantages, by the construction, combination and arrangement of parts illustrated in the drawings.

It is well known that clams must be quickly trapped and removed from very heavy wet sand at a possible depth of perhaps 22 inches, and the accomplishment of this has heretofore been wholly by the use of a spade, shovel or other implement managed by hand. This is naturally slow, uncertain and not economical for the purpose of furnishing clams in quantity for the markets.

No device has heretofore been invented by which power can be applied to the trapping and gathering of clams in and along beaches. It will be clearly seen that I have provided such a device, consisting of a digger or scoop and a conveyer having metallic screens adapted to sift the sand and retain the clams until deposited in a convenient receptacle or dropped in the rear where they may be gathered from the surface.

My device herein described is mounted upon suitable running gear or upon a suitable vehicle, and an engine or power source of such kind as may be desired, is placed upon the vehicle to furnish power to move the conveyer.

Figure 1 is a perspective view of my clam-digging device secured in and upon a four wheeled vehicle. Fig. 2 is a plan view of parts of the conveyer.

Like numerals and figures refer to like parts throughout the views.

I contemplate using a four wheeled vehicle upon which to mount my conveyer, as a usual thing, but it may be equally as well in practice to use a vehicle without front wheels, coupled to a traction engine, which can be operated on beaches with great ease, and other forms of vehicles may also be employed in using my invention as well as those suggested, and serve the purpose to the same extent.

A is the vehicle frame and B the shaft thereof having wheels 3—3' mounted in the usual manner. The vehicle is also provided with forward wheels 23—23' secured to the frame by a hook 24 or other suitable means attached to the shaft 22 on which the wheels are mounted.

C is the conveyer loosely mounted at a suitable distance from its rear end, upon the shaft B and longitudinally with the vehicle frame. The conveyer C has sides 4—4' which may be strengthened by means of any suitable cross braces, and also has four transverse shafts 5—5—5—5' mounted in the sides. Fixedly secured to each shaft 5—5—5—5' are three disks 6—6—6, one near each end and one in the center. To these disks are secured cross pieces or slats 7 Fig. 2 to enlarge the diameter of the conveyer rollers thus formed, to the diameter of the sprocket wheels. At each end of the shafts 5—5—5—5' are mounted sprocket wheels, 8—8', the series of sprocket wheels on each side being connected by sprocket chains 9—9' respectively. At suitable distances apart are wooden chain separators 10, 10'. The endless conveyer screen E is mounted upon the rollers formed by the disks 6 and slats 7. Outside of the conveyer, a pulley 11 is rigidly mounted on the end of the shaft 5' and power is transmitted to this pulley by means of the belt 12 extending to an engine 22 or other suitable source of power which may be placed upon the vehicle frame.

Longitudinal with the conveyer frame and fixedly secured to the end thereof, is the digger D, which is formed of angle iron and sheet metal, and has sides 13—13', of suitable form and height. In front and at the top thereof the digger is provided with surface cutters 14—14', and near its rear end is a surface, angular plow 15. In the vehicle frame is transversely mounted a shaft 16, provided with chains 17—17', secured to it at the upper end and at their opposite ends to the digger trap D. A hand wheel 18 is fixedly mounted outside the vehicle frame upon the shaft 16 and has a pawl and ratchet 19 to lock the shaft. Power to move the vehicle and draw the digger is transmitted through the tongue 20 and chains 21 respectively.

I have shown in Fig. 1 my device as being mounted upon a four wheeled vehicle, but it may also be mounted upon a vehicle having no forward wheels and the tongue of which may be secured to a traction engine or other vehicle, to retain the frame of the vehicle carrying the clam-digger in a horizontal position and draw said vehicle.

It will now be seen that when a traction engine or other desired power is coupled to my device at the tongue 20 and the digger chains 21, the digger is lowered the desired distance by means of the hand wheel 18 and mechanism connected therewith and secured in a determined position. The pulley 11 is connected with the power source on the vehicle. Upon drawing the vehicle forward the conveyer power being applied at the same time, the digger D is caused to dig a furrow in the sand at any desired depth to the extent of say 22 inches, which is the limit usually necessary to go. The plow 15 plows off the surface of the sand in which the clams are not generally found, and relieves the machine of handling an unnecessary load of sand. The surface blades or cutters 14—14' also cut the sand into furrows of proper width for the digger and facilitate its progress. The sand containing the clams thus trapped is pushed backward upon the conveyer, and the rotating screen E of suitably sized mesh sifts the sand upon the beach below and carries the clams to the end of the conveyer where they may either be discharged into a convenient receptacle attached to the vehicle or dropped upon the ground and gathered therefrom as the vehicle proceeds.

While modifications in some of the parts or arrangement thereof may be made to suit the taste of an operator, I have nevertheless shown in the drawings and described the preferred embodiment of my invention and such changes as mentioned would not depart from the principle thereof, as will be easily apparent to those skilled in the art.

Having now fully and fairly described my invention, I claim,—

1. In a clam-digger, the combination with a suitable vehicle carrying thereon a power source and provided with rear wheels having a transverse wheel shaft, of clam trapping or digging mechanism upon said vehicle, and comprising a conveyer C, of suitable form and dimensions, pivotally mounted near its rear end longitudinally of the vehicle upon its rear wheel shaft, and having sides 4—4', an endless rotating screen E, of suitable mesh, provided with sprocket and link chain mechanism, and means to receive and transmit motive power to the conveyer, a digger D, of suitable form and dimensions, fixedly secured to the free end of the conveyer C and having a surface plow 15 at a convenient height thereon, also side furrow blades 14—14', and means whereby the digger may be raised and lowered, substantially as described.

2. A clam-digger, comprising a suitable vehicle provided with rear wheels having a transverse wheel shaft, and clam trapping or digging mechanism upon said vehicle and consisting of a conveyer C, of suitable form and dimensions, pivotally mounted near its rear end longitudinally of the vehicle upon its rear wheel shaft, and having sides 4—4', an endless rotating screen E, of suitable mesh, provided with sprocket and link chain mechanism, and means to receive and transmit motive power to the conveyer, a digger D, of suitable form and dimensions, fixedly secured to the free end of the conveyer C and having a surface plow 15 at a convenient height thereon, also side furrow blades 14—14', and means whereby the digger may be raised and lowered, substantially as described.

3. A clam-digger, comprising a suitable vehicle provided with rear wheels having a transverse wheel shaft, and clam trapping or digging mechanism upon said vehicle, consisting of a conveyer C, of suitable form and dimensions, pivotally mounted near its rear end longitudinally of the vehicle upon its rear wheel shaft, and having sides 4—4', an endless rotating screen E, of suitable mesh, provided with sprocket and link chain mechanism, and means to receive and transmit motive power to the conveyer, a digger D, of suitable form and dimensions, fixedly secured to the free end of the conveyer C, and means whereby the digger may be raised and lowered, substantially as described.

4. In a clam-digger, the combination with a suitable power source placed upon a suitable vehicle provided with rear wheels having a transverse wheel shaft, of clam trapping or digging mechanism upon said vehicle and consisting of a conveyer C, of suitable form and dimensions, pivotally mounted near its rear end longitudinally of the vehicle upon its rear wheel shaft, and having sides 4—4', an endless rotating screen E, of suitable mesh, provided with sprocket and link chain mechanism, and means to receive and transmit motive power to the conveyer, a digger D, of suitable form and dimensions, fixedly secured to the free end of the conveyer C, substantially as described.

WILLIAM J. MUMFORD.

Witnesses:
MARTIN C. WELSH,
W. K. TERRILL.